United States Patent [19]
Coleman et al.

[11] Patent Number: 5,507,935
[45] Date of Patent: Apr. 16, 1996

[54] ON-LINE REACTANT ANALYSIS SYSTEM

[75] Inventors: William B. Coleman, Mesa, Ariz.; Roy J. Lindgren, Naperville, Ill.

[73] Assignee: The United States of America as represented by the Secretary of the Air Force, Washington, D.C.

[21] Appl. No.: 346,591

[22] Filed: Nov. 25, 1994

Related U.S. Application Data

[63] Continuation of Ser. No. 188,510, Jan. 27, 1994, abandoned.

[51] Int. Cl.⁶ .................................................. G01N 27/26
[52] U.S. Cl. ........................ 204/409; 204/400; 204/433; 422/129; 422/132
[58] Field of Search ..................... 204/409, 403, 204/433, 435, 400; 422/129, 132

[56]  References Cited

U.S. PATENT DOCUMENTS

| | | | |
|---|---|---|---|
| 4,532,023 | 7/1985 | Fürst et al. | 204/409 |
| 4,698,208 | 10/1987 | Patchornik et al. | 422/132 |
| 5,030,009 | 7/1991 | Ando et al. | 356/417 |
| 5,078,855 | 1/1992 | Mochizuki et al. | 204/418 |
| 5,081,045 | 1/1992 | McGill | 436/135 |
| 5,230,785 | 7/1993 | Yager et al. | 204/409 |
| 5,244,561 | 9/1993 | Calzi et al. | 204/409 |

*Primary Examiner*—Bruce F. Bell
*Attorney, Agent, or Firm*—Thomas C. Stover; Stanton E. Collier

[57]  ABSTRACT

A reactant monitoring system for monitoring certain properties of, e.g. a BHP reactant solution is provided. Such system incudes a diagnostic conduit loop having one or more sensors in the conduit to measure, e.g. pH and/or ORP of such solution. The solution is pumped through the conduit loop by a pump and the sensors are preferably mounted in the loop, upstream of such pump. The sensors are made of inert materials relative to the monitored solution in the loop, which solution is returned to its source after testing.

7 Claims, 1 Drawing Sheet

ON-LINE REACTANT ANALYSIS SYSTEM

STATEMENT OF GOVERNMENT INTEREST

The invention described herein may be manufactured and used by or for the Government for governmental purposes without the payment of any royalty thereon.

This application is a continuation, of application Ser. No. 08/188,510, filed 27, Jan. 1994 now abandoned.

BACKGROUND OF THE INVENTION

1. Field of the Invention

This invention relates to an apparatus for on-line, analysis of reactants, particularly during the reaction thereof.

2. The Prior Art

Before the present invention, there has been no standard approach for on-line, real time analysis of reactants, e.g. that of basic hydrogen peroxide (BHP) in reactors used to generate singlet delta oxygen $[O_2(^1\Delta)]$ for COIL lasers, to evaluate utilization of reactants and provide warning of approaching reactant depletion. The prior art procedure has been to take samples of the reactants, transfer them to a chemistry laboratory and obtain results several days later. Also the aggressive chemical environment of $Cl_2$, $O_2(^1\Delta)$ strong base and $H_2O_2$; the low test temperature, e.g. $-20°$ C., the violent agitation sparging and solid KCl precipitate in the reactor, have made use of standard electrodes inserted into the reactor, unfeasable.

Attempts have been made in the prior art for concurrent sampling of a process, see for example, U.S. Pat. No. 5,081,045 to McGill (1992). McGill discloses a testing procedure, while not on-line, dips a testing instrument into a reactant bath of e.g., $H_2O_2$, pumps a sample of the bath into a sample chamber 15 from one direction and a reagent, e.g. sodium hypochlorite solution into such chamber 15 from another direction. He then closes certain valves and measures the pressure in the chamber 15, to determine $H_2O_2$ concentration therein; then, by air pressure, purges the reagent mixture back into the reactant bath.

Thus as indicated, the above prior art process 1) is limited to measuring gas pressure for extrapolating $H_2O_2$ concentration therefrom and 2) discharges the reactants into the $H_2O_2$ bath, tending to contaminate same.

Another prior art reference, U.S. Pat. No. 5,078,855 to Mochizuki et al (1992) relates to a particular type of chemical sensor made of a plurality of substrates and being divided such that a membrane portion can be disposed of and the remaining portion can be reused. Again a particular type of chemical sensor is disclosed, with no suggestion of using same in an on-line analysis of BHP reactants.

Accordingly, there is a need and market for a method and apparatus, capable of providing on-line chemical analyses of concentrated, low temperature BHP in real time. There has now been discovered such a system that obviates the above prior art shortcomings.

Such apparatus should be constructed so as not to interfere with the BHP reactants and thus be of inert structural materials and yet provide a stream of (real time) data for monitoring and analysis of the reactants as desired.

SUMMARY OF THE INVENTION

Broadly the present invention provides a reactant monitoring system for flowable reactants in a reactor comprising, a) a conduit having two ends and connected at both of the ends to the reactor to define a conduit loop for the reactor, b) a pump mounted in the loop, to draw the reactants from the reactor, through the loop and back to the reactor and c) at least one sensor mounted in the loop to measure at least one property of at least one of the reactants to monitor same.

Desirably one or more of the above sensors are mounted in the conduit loop upstream of the pump, as further discussed below. Also as discussed below, the inventive apparatus provides in one embodiment, an automatic diagnostic loop to continuously withdraw BHP, circulate it past sensors and return it unchanged to the reactor. The inventive apparatus features base and $H_2O_2$ inert materials of construction and, e.g. a sealed dual-acting bellows pump. PTFE ("Teflon") and hardened glass ("Pyrex"), are preferably used for components wetted with BHP. A preferred design feature is that the one or more sensors are located upstream of the pump so that heat supplied to the BHP by the pumping operation does not affect sensor readings.

BRIEF DESCRIPTION OF THE DRAWINGS

The invention will become more apparent from the following detailed specification and drawings in which.

DESCRIPTION OF PREFERRED EMBODIMENTS

Figure 1:
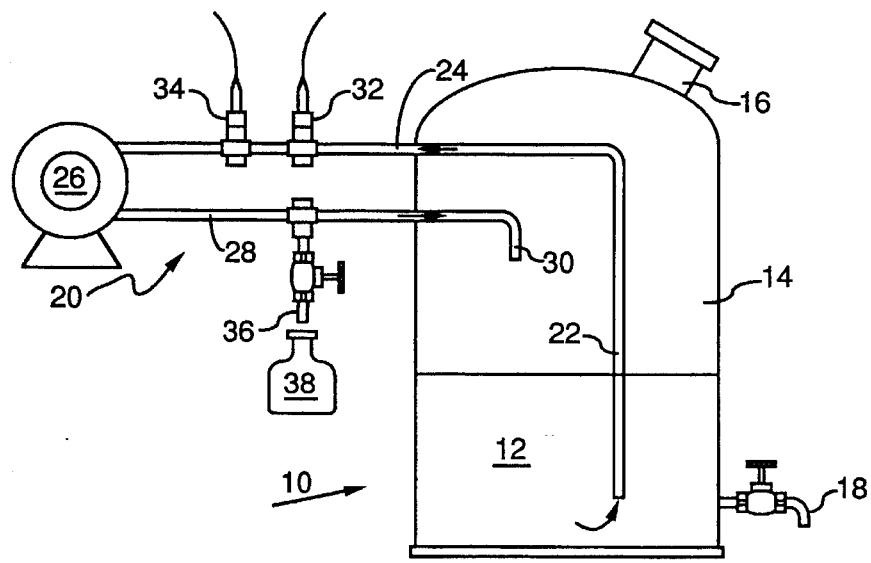
FIG. 1 is a schematic elevation view, partly in section, of the on-line analysis system embodying the present invention

Referring in more detail to the drawings, reactor 10 has, e.g. BHP reactant solution 12, a gas collection chamber 14 for, e.g. singlet delta oxygen, gas outlet port 16 and solution sample draw-off tap ( discharge port 18, as shown in FIG. 1.

Draw-off tap 18 illustrates a BHP sampling means per the prior art.

Per the present invention a diagnostic conduit loop 20 is provided, having intake pipe 22, transmittal pipe 24, pump 26, return pipe 28 and delivery pipe 30, as shown in FIG. 1. In such diagnostic loop 20 are also pipe line sensors 32 and 34 and spigot sample test tap 36, as shown in FIG. 1.

In operation, the reactants from the BHP solution 12 are drawn by the pump 26 through the pipes 22 and 24 for monitoring by test probes or sensors 32 and 34, as shown or indicated in FIGS. 1, 2, 3 and 4. Thereafter as indicated in FIG. 1, the test solution is drawn through pump 26 and return pipe 28 past test nozzle 36, where an additional sample can be drawn off into bottle 38 for conventional (and delayed) lab testing in the manner of the prior art. The remaining test solution continues through delivery pipe 30 where it is returned to the BHP reactant solution 12, as shown in FIG. 1. Also an additional sample of the BHP solution can be taken at draw-off tap 18 for a further (delayed) lab test sample, per the prior art, as indicated in FIG. 1.

Thus the present invention relates to on apparatus which is capable of performing on-line chemical analyses of concentrated, low temperature basic hydrogen peroxide (BHP) in real time. It is suitable for analysis of e.g. solutions which range from 20–90% w/w $H_2O_2$, 0–35% w/w alkali, 0–5% w/w chloride salt and the remainder water. It is suitable for analysis of solutions over the temperature range −25° C. to +20° C. It does not catalyze nor in any other way accelerate the decomposition of the $H_2O_2$ component. It is automated and can be operated remotely for safety.

The apparatus of the invention has sensor electrodes which are stable in the severe chemical and thermal environment and which measure the hydrogen ion concentration (pH) and the oxidation reduction potential (ORP) over the above concentration and temperature ranges without being adversely affected. The apparatus employs inert structural materials which are neither degraded by the BHP nor cause decomposition or other composition change to occur in the BHP, and further employs electrolyte compositions and electrode materials in the sensors which are inert in the BHP if the sensors fail mechanically.

Not part of the invention but of assistance in its utilization, are strip charts and digital meter displays of the signals obtained from the various sensors employed, per the method and apparatus of the present invention.

The following Table is provided as an illustration of the present invention and should not be construed in limitation thereof. Such Table is a comparison of analytical results delivered in real time by the electrodes in the flow loop 20 of e.g. FIG. 1 with confirmatory results (delivered two days later) by conventional wet chemical analysis of a sample taken from the system, e.g. at Test Tap 36 of FIG. 1.

TABLE 1

| Measured Constituent | Comparison of Analytical Results (% w/w) | |
| --- | --- | --- |
| | Flow Loop | Wet Chemical |
| KOH | 33.4 | 33.4 |
| $H_2O_2$ | 24.8 | 26.6 |

Figures 2, 3, 4:
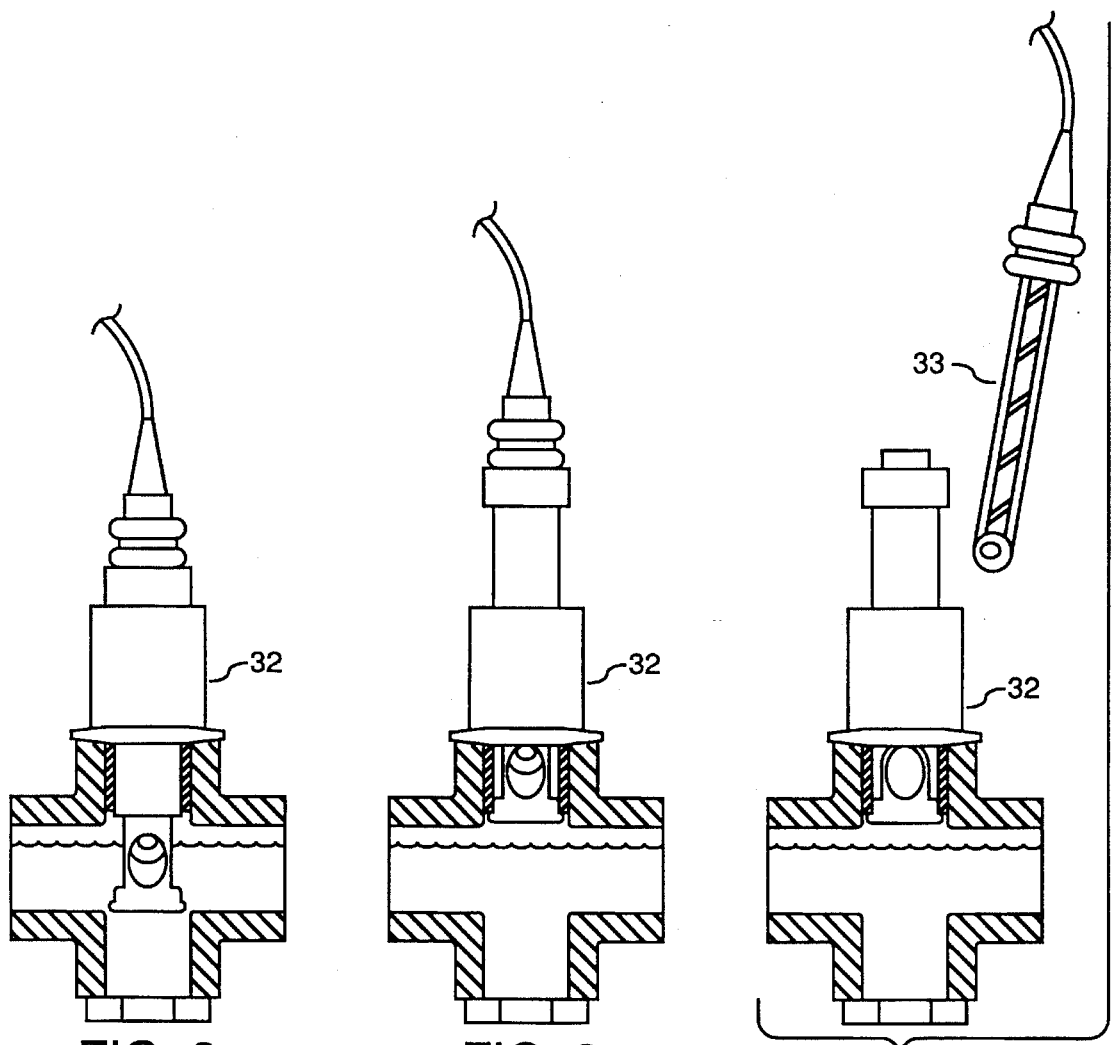
FIGS. 2, 3 and 4 are sectional elevation schematic views of a sensor mounted on-line, in the above process, according to the present invention.

Various in-line sensors can be employed per the method and apparatus of the present invention, e.g. pH and ORP in-line sensors. Such in-line sensors of inert metals are available, including electrodes which are removable without shutting down flow, an example of which is shown in FIGS. 2, 3 and 4. Thus sensor 32, in line 24, retracts for removal of electrode 33, as shown in FIGS. 2, 3 and 4.

Thus the method and apparatus of the invention provide real time, on-line analysis for chemical control of a reactor operation of e.g. a BHP solution.

What is claimed is:

1. A reactant monitoring system for flowable reactants in a reactor having a discharge port comprising:
    a) a conduit having two ends and connected at both ends to said reactor to define a conduit loop, said ends both extending into said reactor, at a zone removed from and unconnected to said discharge port, for taking interior samples of said reactants,
    b) a pump mounted in said loop to draw said reactants from said reactor through said loop and back to said reactor and
    c) at least one sensor mounted in said loop between said reactor and said pump and upstream of said pump to measure at least one property of at least one of said reactants to monitor same.

2. The reactant monitoring system of claim 1 wherein said sensor is a pH sensor.

3. The reactant monitoring system of claim 1 having two sensors, a pH sensor and an oxidation reduction potential sensor.

4. The reactant monitoring system of claim 3 wherein said sensors are made of inert materials at least where said sensors contact the reactant solution.

5. The reactant monitoring system of claim 4 wherein said sensors are capable of operating or retaining function in a range of −25° C. to +20° C.

6. The reactant monitoring system of claim 1 wherein said reactor is a basic hydrogen peroxide reactor for generating singlet delta oxygen for COIL lasers.

7. The reactant monitoring system of claim 1 wherein one end of said conduit extends into said reactor and down into said reactants for sample intake thereof.

* * * * *